(12) United States Patent
Araki

(10) Patent No.: US 7,648,615 B2
(45) Date of Patent: Jan. 19, 2010

(54) METHOD OF SMOKING/BURNING TYPE VOLUME REDUCTION TREATMENT AND APPARATUS THEREFOR

(75) Inventor: Kuniomi Araki, Inaba Bldg. 202, 13-19, Minamidai 4-chome, Sagamiharashi, Kanagawa, 2280814 (JP)

(73) Assignees: Kazuhiko Takada, Yokohama-shi (JP); Mamoru Ozawa, Tokyo (JP); Koichiro Yanagisawa, Ueda-shi (JP); Kuniomi Araki, Sagamihara-shi (JP)

( * ) Notice: Subject to any disclaimer, the term of this patent is extended or adjusted under 35 U.S.C. 154(b) by 393 days.

(21) Appl. No.: 11/596,816

(22) PCT Filed: May 12, 2005

(86) PCT No.: PCT/JP2005/008687

§ 371 (c)(1),
(2), (4) Date: Nov. 17, 2006

(87) PCT Pub. No.: WO2005/110634

PCT Pub. Date: Nov. 24, 2005

(65) Prior Publication Data

US 2007/0221491 A1 Sep. 27, 2007

(30) Foreign Application Priority Data

May 18, 2004 (JP) ............................. 2004-174806

(51) Int. Cl.
*C10B 29/00* (2006.01)
*C10B 19/00* (2006.01)

(52) U.S. Cl. .................. 201/18; 202/100; 202/117; 202/216; 110/245; 588/19; 201/19; 201/36

(58) Field of Classification Search .................. 202/100, 202/117, 216; 110/245; 588/19; 201/18, 201/19, 36
See application file for complete search history.

(56) References Cited

U.S. PATENT DOCUMENTS 6,084,147 A * 7/2000 Mason ........................ 588/19

(Continued)

FOREIGN PATENT DOCUMENTS

| JP | 51-5880 | 1/1976 |
| JP | 59-29937 | 8/1984 |

(Continued)

OTHER PUBLICATIONS

Japanese to English Machine Translation of JP 2004-136249.*

*Primary Examiner*—N. Bhat
(74) *Attorney, Agent, or Firm*—Kratz, Quintos & Hanson, LLP

(57) ABSTRACT

In the operation of smoking/burning type volume reduction treatment apparatus (1), referring to view (A), charcoal carbonized layer ($T_2$) is spread over powdery ceramic layer ($T_1$) in the state of having negative ion air fed through air supply inlet (H). Further, sawdust layer ($T_3$) is spread thereover, and thereafter treatment subject layer (V) is piled thereon. In a temporary burning region of the carbonized layer ($T_2$), the powdery ceramic layer ($T_1$) exerts not only heat storing action but also heat radiation action. Referring to view (B), the interior of the sawdust layer ($T_3$) is altered into temporary carbonized layer ($T_{3\,1}$) and temporary dried layer ($T_{3\,2}$). As the temporary burning region slowly moves upward, an under side of the treatment subject layer (V) is altered into dried layer ($V_1$) and further, carbonized layer ($V_2$) shown in view (C) is formed. Thereafter, this carbonized layer ($V_2$) catches fire, so that burning region ($V_3$) is formed in layered form in the treatment subject layer (V). Thus, smoking/burning starts. Accordingly, there can be provided a method wherein a burning region is securely formed in the treatment subject within the apparatus (1).

30 Claims, 11 Drawing Sheets

U.S. PATENT DOCUMENTS

| | | | |
|---|---|---|---|
| 6,379,629 B1 * | 4/2002 | Kanai | 422/204 |
| 7,063,026 B1 * | 6/2006 | Kanai | 110/341 |
| 2004/0020415 A1 * | 2/2004 | Oh | 110/346 |

FOREIGN PATENT DOCUMENTS

| | | | |
|---|---|---|---|
| JP | 2004-12113 | | 1/2004 |
| JP | 2004-033966 | | 2/2004 |
| JP | 2004-136249 | * | 5/2004 |
| JP | 2004-202469 | | 7/2004 |
| JP | 2005-48150 | | 2/2005 |
| JP | 2005-139338 | | 6/2005 |

* cited by examiner

FIG. 3
(A)
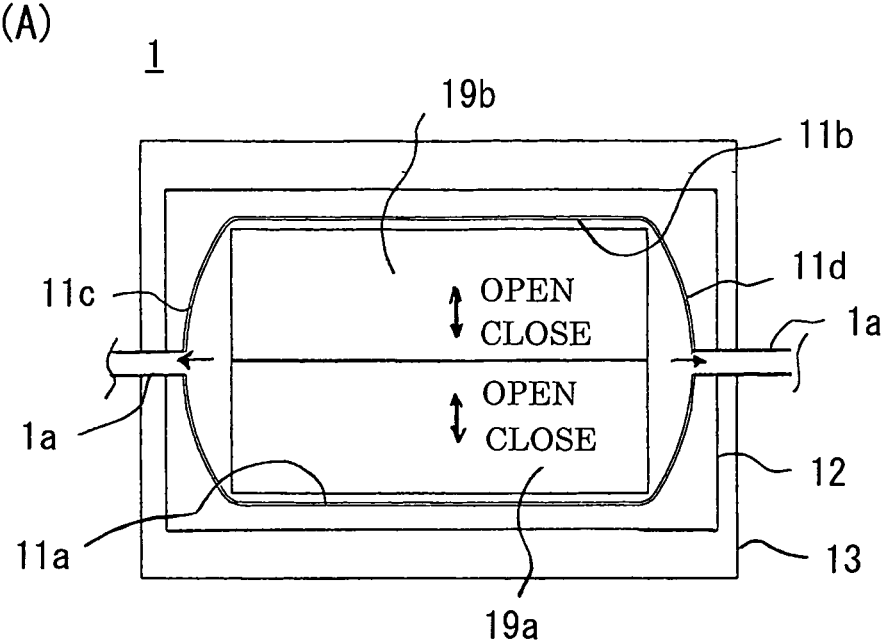
(B)
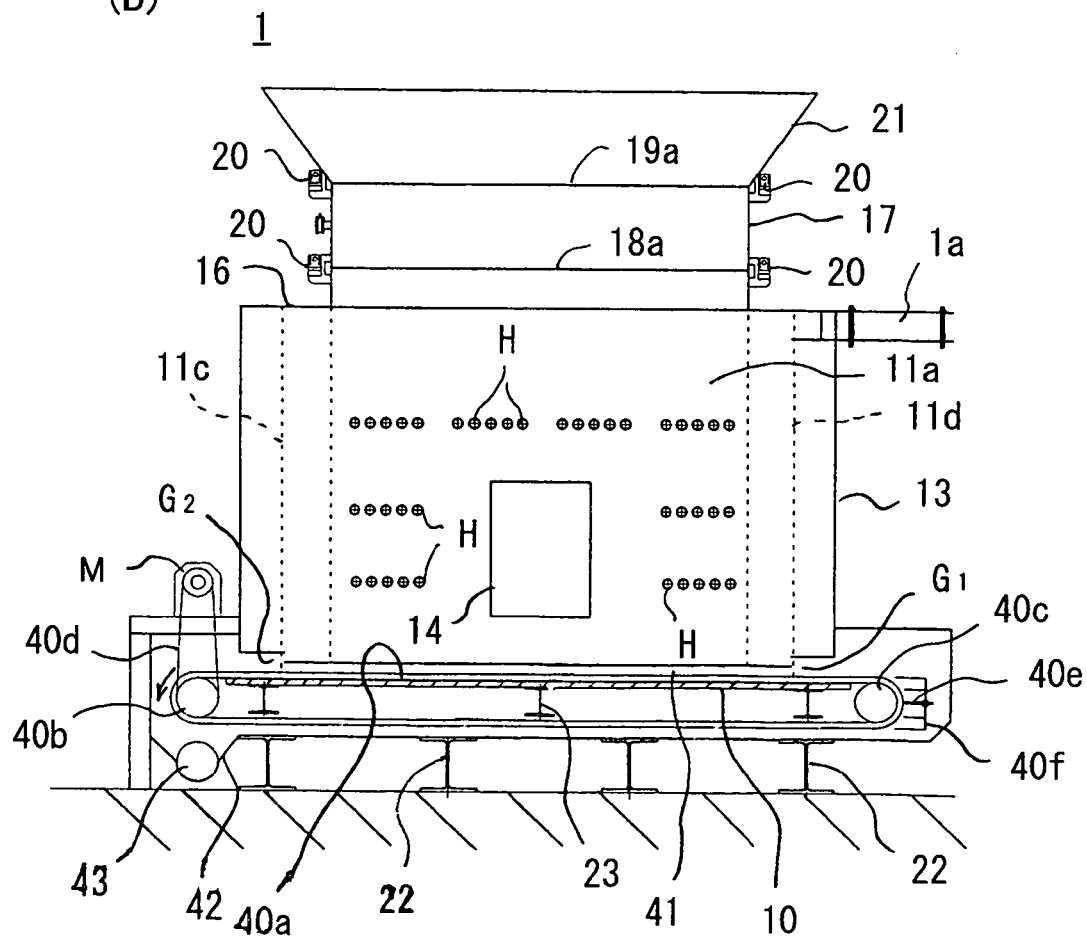

FIG 5
(A)
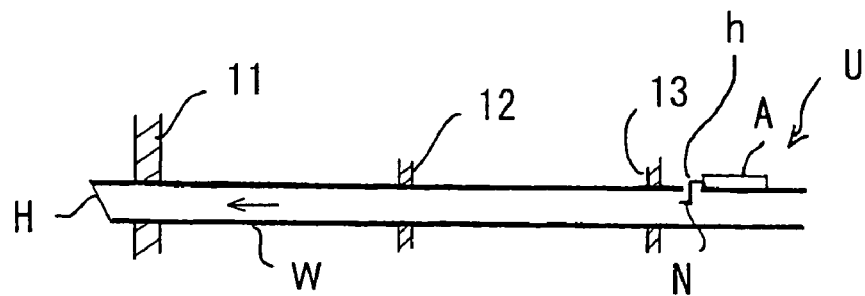
(B)
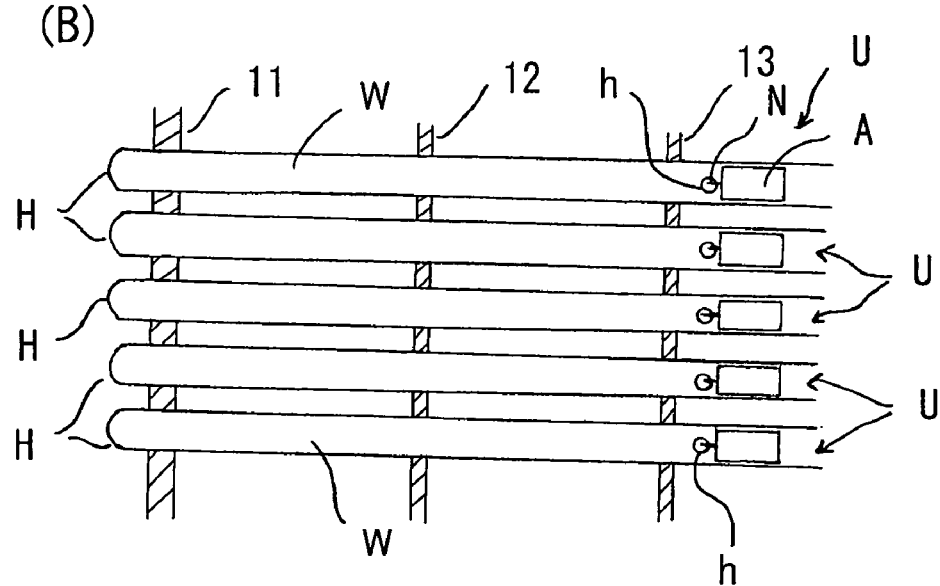
(C)
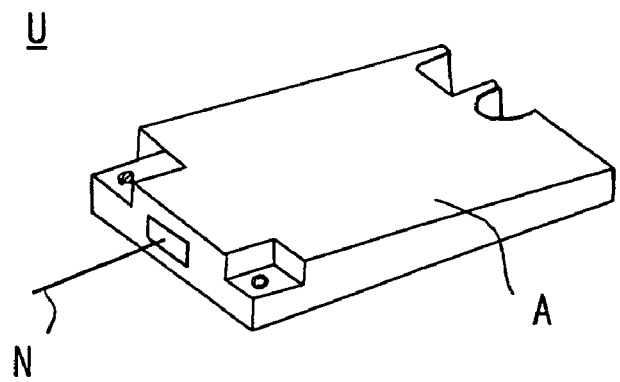

FIG 6
(A)
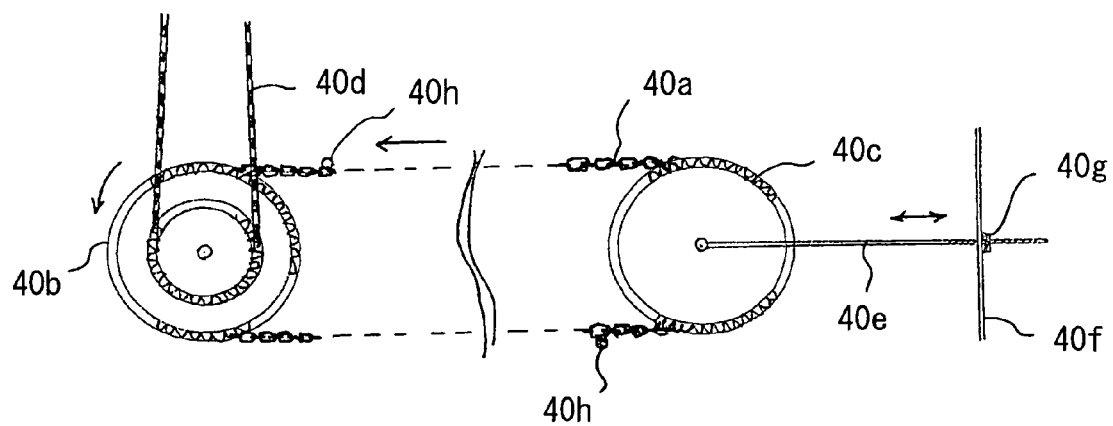
(B)
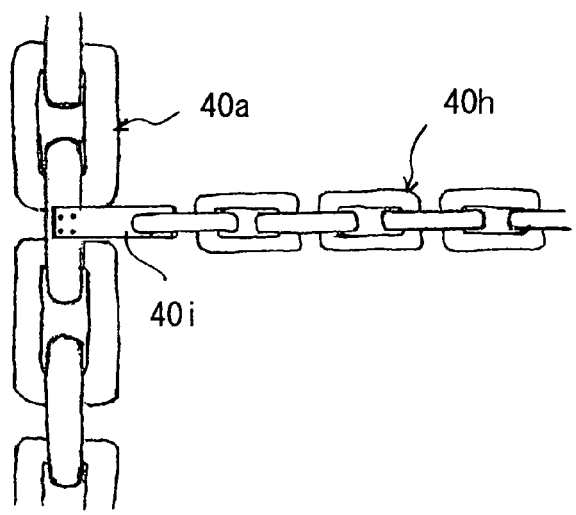

FIG 9
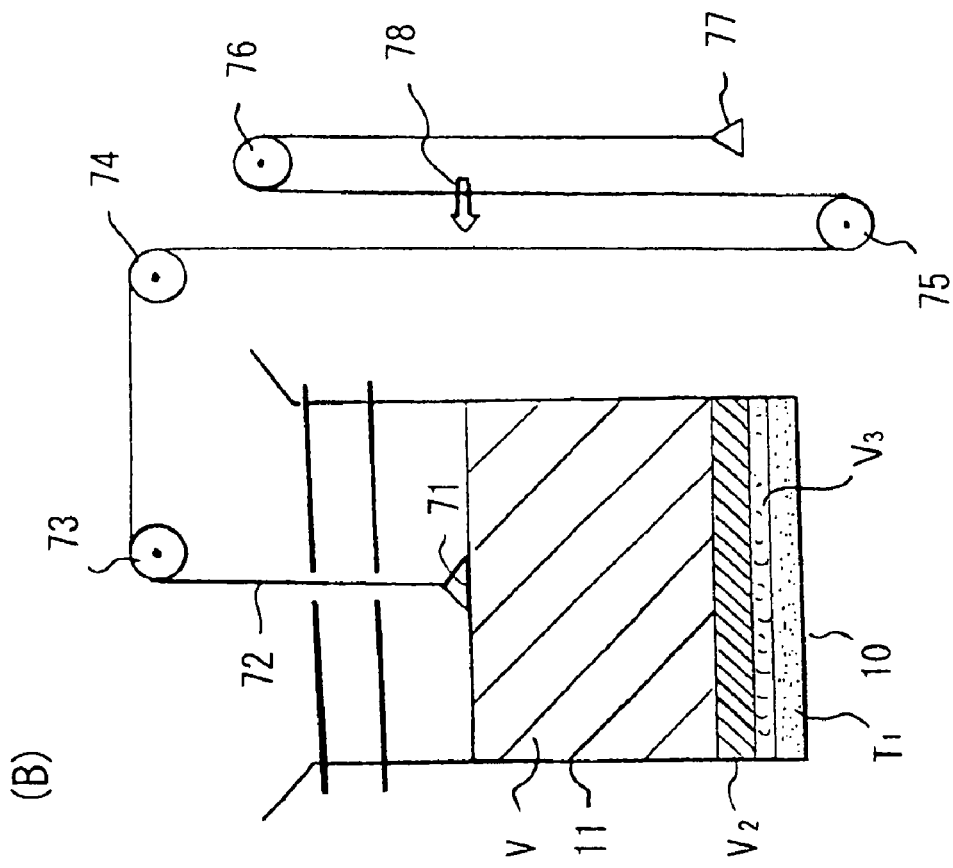
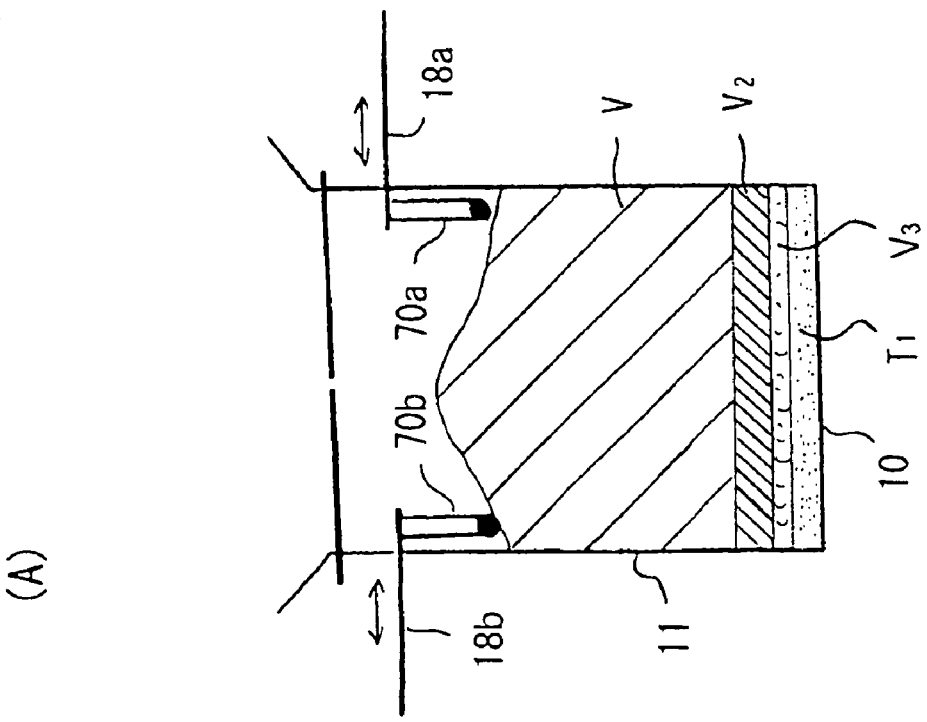

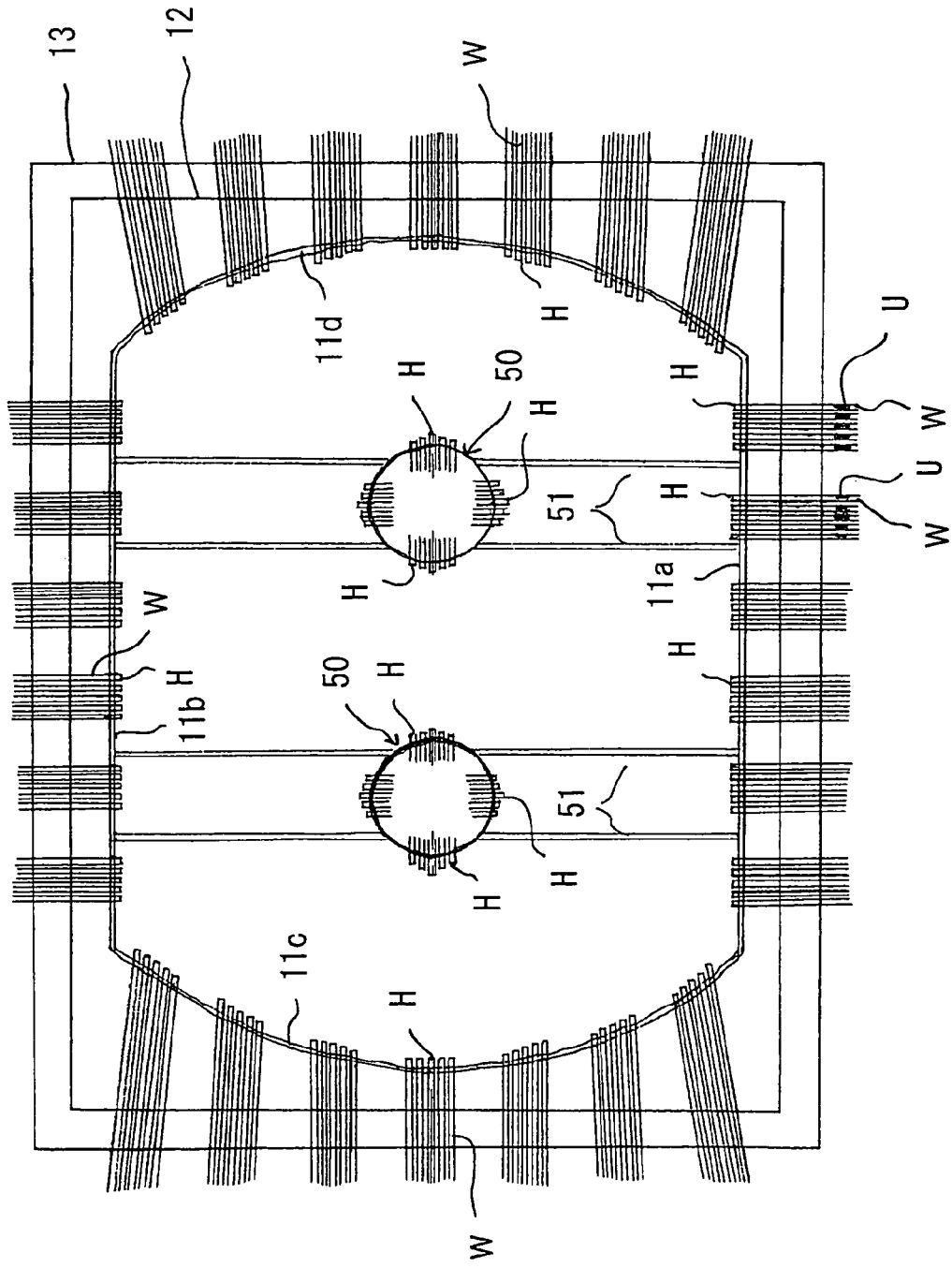

METHOD OF SMOKING/BURNING TYPE VOLUME REDUCTION TREATMENT AND APPARATUS THEREFOR

TECHNICAL FIELD

The present invention relates to containment disposal technology reducing the volume of garbage etc. inside a dry distillation vessel by flameless combustion (smoldering), more particularly relates to a method of smoking/burning (smoldering) type volume reduction treatment and apparatus therefor able to realize reliable formation of a soaking region of garbage etc. and stable sustenance of that soaking region (self combustion) even in a large volume dry distillation vessel and thereby greatly improving the disposal capability.

BACKGROUND ART

The "smoking/burning", in other words, "smoldering", means "flameless combustion". This "flameless combustion" corresponds to a combustion mode exhibiting only a core of an internal flame with none of the sustained flame from the surface of the flammable matter in "flame combustion" (external flame and outside surface part of internal flame). In this smoldering region, flammable particles (grounds) receiving heat energy from the soaked flammable surface (top surface) obtain kinetic energy and rise up. Since no flame is accompanied with this, no oxidation reaction occurs. There is almost zero oxygen (air) consumption. The flammable matter gradually changes to a carbonizing layer by the internal flammable particles escaping from the flammable surface. Further, when the back surface (bottom surface) of this carbonizing layer ignites as a strong flame, this forms a soaking region (high heat region) for making the flammable matter itself smolder well from top to bottom. The carbonizing layer itself is converted to ash resulting in reduction of volume of the flammable matter. For this reason, the amount of oxygen required for reduction of the volume of the flammable matter (volume reduction rate 1/100 to 1/500) need only be the amount for conversion of the carbonizing layer to ash. Rather, due to the need to limit the supply of oxygen to prevent flame combustion, this is suitable as a containment volume reduction disposal method. Further, the flammable particles floating in the vessel deposit on the inside surface of the vessel as tar etc. for repeated smoldering. Also, by taking the dry distillation gas (smoldering gas) out from the vessel without burning or without discharge into the atmosphere, there are the merits that the gas can be made harmless or recycled by concentration and liquefaction or other final disposal.

However, the soaking region is covered by a solid carbonizing layer above it. Further, the soaking region slowly rises and does not remain at a constant position. Therefore, it is difficult to sustain the supply of oxygen to the soaking region. Until the flammable matter changes to a carbonizing layer, sufficient drying and dry distillation are necessary. For sustained smoldering, it is necessary to maintain a soaking region at the carbonizing layer under the flammable matter deposited in the sealed vessel. One of the conditions for maintaining this soaking region is locally raising the temperature (in a layer) and holding that high temperature by an oxidation reaction in the soaking region. To meet this latter condition, ceramic is laid at the bottom of the vessel and the flammable matter is deposited over it. Once a soaking region is formed at the interface between the ceramic layer and deposited flammable matter; the ceramic layer exhibits a heat storing action and heat radiating action. Further, some negative ions are generated. Due to this, the high temperature of the soaking region is sustained. Further, the ash produced accompanying the oxidation reaction of the carbonizing layer is sandwiched between the ceramic layer and soaking region, melts at the high temperature, and therefore is reduced in volume and gradually builds up in the ceramic layer as powder ceramic (substance similar to aero fins included in volcanic ash etc.), so the action by the ceramic cyclically accompanies the soaking region as it gradually moves upward region. The powder ceramic excessively increasing in the vessel can be taken outside of the vessel while leaving the part forming the ceramic layer and thereby can be recycled as useful matter.

On the other hand, to establish the former condition, it is necessary to blow a suitable amount of air into the vessel from the outside.

However, the technology for reducing the volume of the disposed matter in this smoldering apparatus in a sealed manner is disclosed in Japanese Patent Publication (A) No. 2004-136249 and Japanese Patent Publication (A) No. 2004-33966. Japanese Patent Publication (A) No. 2004-136249 describes blowing negative ion air generated by a plasma discharge type negative ion generator into a powder ceramic layer deposited on the bottom of a dry distillation vessel through negative ion intake ports in the horizontal direction so as to cause convection inside the powder ceramic layer. Further, it describes loading the disposed matter into the dry distillation vessel, then blowing in negative ion air and igniting the disposed matter from a residue discharge gate using an ignition burner etc. so as to lower the oxidation reduction potential inside the vessel by the negative ion air and create a reducing atmosphere for the start of smoldering. Further, Japanese Patent Publication (A) No. 2004-33966 blows negative ion air generated in a strong magnetic field of a permanent magnet through an air intake pipe from the center of the side of the dry distillation vessel to the inside of the vessel.

The significance of the blowing of the negative ion air is both the supply of a suitable amount of oxygen and the negative ion effect. The negative ion air enables the oxidation reduction potential inside the vessel to be reduced and a reducing atmosphere to be formed and enables flame combustion to be suppressed. In addition, in the soaking region, the particulate matter in the smoldering gas is vigorously generated as unstable positive ions, so the negative ions supplied from the outside and the Coulomb force quickly combine for an oxidation reaction which locally promotes a soaking region and sustains smoldering. Further, the particulate matter in the dry distillation gas floating above of the disposed matter is also positively charged, so if negative ions bond with and neutralize it, it declines in floating ability and easily aggregates. It therefore sinks down and settles in the vessel, is deposited on the inside surface of the vessel as tar etc., and again smolders, so it is possible to reduce the amount of gas led out from the vessel and raise the efficiency of the containment disposal.

Patent Document 1: Japanese Patent Publication (A) No. 2004-136249 (Paragraph No. 0030 to 0032, FIG. 1, FIG. 2)

Patent Document 2: Japanese Patent Publication (A) No. 2004-33966 (Paragraph No. 0019, 0021, FIG. 1, FIG. 2)

DISCLOSURE OF THE INVENTION

Problems to be Solved by the Invention

Japanese Patent Publication (A) No. 2004-136249 describes blowing negative ion air into the powder ceramic layer from negative ion intake ports at the bottom of the sides of the vessel in the horizontal direction so as to cause convection and reacting the minerals (metal substances) contained in the ceramic with chlorine to form $CaCl_2$, $MgCl_2$, $MgCl_2$, $ZnCl_2$, and other simple salts, but the thicker the powder ceramic layer, the sparser the concentration of negative ions passing through it, rising directly upward, and reaching the soaking region, so it is necessary to limit the thickness of deposition of the powder ceramic layer and necessary to limit the depth of the vessel (thickness of disposed layer). Vessels are limited to small sized ones and there are limits to the improvement of the disposal capability. Further, the soaking region has to generate the carbonizing layer and the drying layer in a layer manner, so the soaking region also has to be formed in a layer manner, but Japanese Patent Publication (A) No. 2004-136249 generates the soaking region by direct ignition of the disposed matter from the residue discharge gate by an ignition burner. Generation evenly in a layer is impossible. Even if a soaking region is formed once in the disposed matter near the residue discharge gate, the soaking region is difficult to sustain in a state where the powder ceramic layer is not considerably overheated.

On the other hand, Japanese Patent Publication (A) No. 2004-33966 does not disclose anything about the method for causing the formation of the soaking region, but it blows negative ion air through a single thick intake pipe from the center of the side of a dry distillation vessel to the inside of the vessel to make the inside of the vessel a gaseous atmosphere including negative ions. However, if the single intake port is clogged by the disposed matter, neither the introduction of negative ions nor introduction of the required amount of oxygen will be constant, so the soaking region will gradually be consumed and the soaking region will not be able to be stably sustained.

Therefore, in view of said problem, a first object of the present invention is to provide a smoldering type volume reducing disposal method able to reliably form a soaking region in the disposed matter itself as can be employed in actual apparatus.

The second object of the present invention is to provide a smoldering type volume reducing disposal apparatus able to stably maintain a soaking region of the disposed matter itself even in a relatively large volume vessel and further able to greatly improve the disposal ability.

Means For Solving The Problems

To solve the first problem, the inventors first tried arranging several electric heating rods over the powder ceramic layer, but the heat emitted from the electric heating rods ended up being absorbed by the powder ceramic layer they contacted, so even with large power electric heating rods, formation of a soaking region was difficult. Therefore, they tried arranging the electric heating rods elevated a bit above the powder ceramic layer, but the disposed matter present between the powder ceramic layer and the electric heating rods also ignited, so a mixture of ash and carbides piled up over the insufficient heat storage powder ceramic layer and the heat radiating action was also blocked, therefore burning formed once at the tops of the electric heating rods gradually extinguished. The inventors also tried changing the wattage and number of the electric heating rods and the distance between the powder ceramic layer and the electric heating rods several times, but no layered formation of a soaking region could be observed.

However, when the disposed matter is sawdust, wood chips, or other wood-based materials, while the soaking region was not formed in a layer, it was possible to observe relatively smooth ignition. The inventors considered that by packing a tinder material enabling the formation of a provisional soaking region and provisional carbonizing layer in layers (provisional burning material) between the disposed layer and the powder ceramic layer in advance, the provisional soaking region would gradually proceed upward in the tinder material, the carbonizing layer and the drying layer would gradually be formed in the disposed material layer, and finally the soaking region would naturally spread to the carbonizing layer of the disposed layer itself. Unlike with the direct ignition by the ignition burner or electric heating rods, this is a primitive technique of spreading fire, but good results were obtained.

That is, the first means of the present invention is a smoldering type volume reducing disposal method wherein the inside of a dry distillation vessel into which air including negative ions is introduced is comprised, from the bottom of the vessel, of a ceramic layer and a disposed layer, a soaking region is sustained between the ceramic layer and a carbonizing layer with a changing bottom side in the disposed layer, the soaking region gradually travels to the top of the disposed layer following the carbonizing layer at its top side, the disposed layer is dry distilled and the dry distillation gas is guided outside of the vessel, the ash produced in the soaking region is converted to powder ceramic and built up as part of the ceramic layer, and said disposed layer gradually sinks down by its own weight for reduction of the volume, characterized by laying over the ceramic layer a tinder material including a provisional soaking region at its bottom surface while feeding negative ion air from air feed holes, then depositing disposed matter over it.

If using the provisional soaking at the bottom surface of the tinder material to preheat the region ceramic layer, the ceramic layer acts to store the heat and simultaneously radiate the heat, so the inside of the tinder material changes to a provisional carbonizing layer and provisional drying layer, the provisional soaking region gradually proceeds upward, the bottom side of the disposed layer gradually changes to a carbonizing layer and drying layer, and finally the carbonizing layer of the disposed layer naturally catches fire from the provisional soaking region and forms a soaking region in a layer manner. When the soaking region is formed at the disposed layer in a layer manner, since the disposed layer (flammable layer) is already formed with the carbonizing layer, after catching fire, the more the soaking region proceeds through the carbonizing layer, the drying layer follows above it, which leads to the soaking region being stably sustained as well. For this reason, the invention can also be applied to a dry distillation vessel with a large bottom surface area. Prototypes prove that a practical apparatus with a volume of 5 $m^3$ or more can be realized.

As this preparatory stage, it is preferable to lay charcoal, coke, or another charcoal layer over the ceramic layer, then lay a layer of sawdust, wood chips, or other combustible matter. The layer of combustible matter should be matter with a low porosity. Sawdust or other fluid particle matter is preferable. Further, as the charcoal layer, from the viewpoint of price and sustainability of the provisional soaking region, charcoal is suitably used.

Further, to solve the second problem, a second means of the present invention is a smoldering type volume reducing disposal apparatus comprised of a dry distillation vessel into which air including negative ions is introduced having a ceramic layer and disposed layer packed in it from the bottom of the vessel, sustaining a soaking region between the ceramic layer and a carbonizing layer changing in bottom surface in the disposed layer, and thereby reducing the volume of said disposed layer, characterized in that air including negative ions is blown inside the vessel by arranging a large number of air feed holes dispersed at the inside of a surrounding wall of the vessel.

By providing a large number of air feed holes, it is possible to make the air feed holes suitably small in size, so the flow rate can be made relatively stronger by that extent. When the disposed matter gradually sinks in the vessel and approaches the air feed holes, it can be blown away to prevent the air feed holes from clogging. Further, it is possible to suppress the deposition of tar on the air feed holes. Further, since a large number of air feed holes are arranged dispersed, even if any air feed holes happen to become clogged, it is possible to supply air including negative ions from the remaining air feed holes and stably sustain the soaking region. Further, even if the vessel is deep and the level of the soaking region rises, air including negative ions is supplied from the group of nearby air feed holes, so the soaking region can be stably sustained. Further, the soaking region is supplied with negative ions rising upward from the ceramic layer and negative ions supplied from the surrounding large number of air feed holes to the center direction no matter what the height level, so the soaking region can be stably sustained. For this reason, a deep dry distillation vessel can be used, a large volume volume reducing disposal apparatus suitable for a practical apparatus can be realized, the frequency of loading the disposed matter can be reduced, and operational control can be simplified.

On the other hand, when using a vessel with a large bottom surface area, the negative ion air blown in from the air feed holes of the surrounding wall eventually changes to thermal motion inside the vessel, so the air has a hard time reaching the center of the vessel and has an effect on the sustainability of the soaking region near the center. Therefore, the dry distillation vessel preferably has a columnar body at the inside of the surrounding wall separated from the surrounding wall and has a large number of air feed holes arranged dispersed at the outside surface of the columnar body. By providing one or more columnar bodies near the center of the inside of the vessel, it is possible to blow negative ion air from the large number of air feed holes of the outside surface so as to sustain the soaking region near the center of the vessel as well. For this reason, it is possible to employ a vessel with a large bottom surface area and realize a large volume practical apparatus.

Further, the dry distillation vessel is not limited to the case of provision of said columnar body. It is also possible to employ a configuration having a partition dividing the inside space in the vertical direction and having a large number of air feed holes arranged dispersed at the outer surface side of said partition and possible to use a vessel with a large bottom surface area.

Here, even when the air feed holes are small, for safety, it is preferable to provide blocking means for preventing the entry of said disposed matter or tar etc. into the ports along with settling movement of the disposed layer. By this, it is possible to reliably prevent the air feed holes from clogging and possible to reduce the frequency of maintenance inside the vessel. For example, the air feed holes preferably have edges with upper sides projecting outward from lower sides of the edges to form inclined openings. These function as means for blocking disposed matter without obstructing the blowing rate from the air feed holes and can prevent clogging etc.

In the present invention, air feed pipes connected to said air feed holes pass through said surrounding wall and negative ion generation units are provided at positions of said air feed pipes at the outside of said surrounding wall near the surrounding wall so as to charge the air being fed in said air feed pipes with negative ions. That is, each air feed hole is provided with a negative ion generation unit at a position near the outside of the surrounding wall. Since negative ion air from a single negative ion generator is not branched and fed to a large number of air feed holes, it is possible to raise the concentration of negative ions blown from each air feed hole into the vessel. This contributes to stably sustaining the soaking region. Further, since the negative ion generation unit is provided at a position near the outside of the surrounding wall, the flight distance of the negative ions inside the vessel can be minimized and the injection efficiency can be improved. This contributes to stably sustaining the soaking region.

Here, as the source of generation of the negative ions, like ceramic etc., stone is known, but this is weak, so is not preferable. Further, a plasma discharger also discharges negative ions, but ends up simultaneously producing unnecessary ozone, toxic NOx, etc., so is not preferable. An electron discharge apparatus producing negative ions at a high concentration and not producing harmful ozone etc. is preferable. This electron discharger has a pin-shaped negative electrode.

Therefore, it is preferable to attach the body of the negative ion generation unit to the air feed pipe and insert the pin-shaped negative electrode projecting out from the unit through a small hole formed at the wall of the air feed pipe into the pipe facing the downstream side of the fed air. The pin-shaped negative electrode has a certain extent of directivity of the electron discharge, so it is possible to make the discharged electrons proceed from the front end of the pin-shaped negative electrode to the inside of a cubic space near the air feed hole and consequently possible to raise the rate of entry into the vessel and ionization of the oxygen atoms engaged in thermal motion. For this reason, the ionization efficiency rises, and a high concentration of negative ions can be supplied. This contributes to stably sustaining the soaking region. Further, the front end of the pin-shaped negative electrode is exposed to the fed air comprised of outside air in the air feed pipe, so gradually becomes contaminated and is liable to drop in electron discharge ability, but the pin-shaped negative electrode can be taken out from the small hole of the air feed pipe, so can be easily periodically cleaned.

On the other hand, the air feed pipe is preferably a branch pipe connected to a conduit of a blower blowing outside air in through a filter and branched into one or more levels. If providing a fan motor or other small sized blowing means at the position of the negative ion generation unit of each air feed pipe, power lines at nearby locations are sufficient, so production of the volume reducing disposal apparatus becomes easy, but each small sized blowing means has to be provided with a filter, so the maintenance cost for filter replacement ends up rising. However, if using a plurality of branched pipes, while the production costs rise by the amount of trouble in the pipe laying work, just a single filter need be provided at a central blower, so filter replacement and other maintenance can be greatly reduced.

When the disposed layer deposited in the vessel settles a considerable amount due to its own weight, to keep the soaking region serving as the kindling from being consumed, it is necessary to load the next disposed matter. Therefore, the volume reducing disposal apparatus is preferably provided with an inside lid provided at the top loading port side of the vessel and an outside lid provided above this inside lid creating a temporary storage space for disposed matter. When loading disposed matter for adding to the pile, first the outside lid is opened and the disposed matter is loaded into the temporary storage space above the inside lid, then the outside lid is closed. When opening the inside lid, the disposed matter in the temporary storage space drops down into the vessel for adding to the pile. Due to this double lid structure, the dry distillation gas inside the vessel can be kept from being released into the outside air and the outside air can be kept from entering the vessel causing flame combustion. Further, if preloading disposed matter in the temporary storage space before the work of adding to the pile of the disposed matter, it is possible to have the large moisture content disposed matter etc. drained and dried in advance by the heat of conduction and waste heat from the bottom whereby the disposal time can be shortened.

Here, as the inside lid, a sliding door like lid which can be slid in the horizontal direction is preferable. Since the disposed matter in the temporary storage space can be piled up in advance in a layer manner, in the process of gradually opening the inside lid, the disposed matter drops into the vessel from the edge of the inside lid moving in the horizontal direction and consequently the increased disposed matter becomes generally layer shaped. Further, this sliding door lid is preferably a pair of lid plates able to slide in different directions. This enables the projecting length of the inside lid in the open state to be halved and contributes to improvement of space efficiency and facilitation of strength design of the support and drive apparatus. Further, the time required for opening and closing is halved, so the amount of dry distillation gas entering the temporary storage space can be kept down. Note that it is preferable to provide a drop hopper above the outside lid.

When piling disposed matter on the inside lid in a layer in advance as explained above, in principle a loading port area the same as the sectional area of the vessel is required. Therefore, it is preferable to provide an evening means for raking and leveling the surface of the disposed matter loaded from above the vessel. This evening means can be configured to be flat against the surrounding wall of the vessel when loading the disposed matter so as not to obstruct the loading of the disposed matter and to perform the leveling operation after loading, but gives rise to the inconvenience of provision of a power transmission system inside the vessel. Therefore, the evening means is preferably configured to operate coupled with the lid provided at the top loading port of the vessel. For example, it is sufficient to connect a raking member below the sliding lid.

Along with the repeated addition of disposed matter, the level of the ceramic layer inside the vessel rises, so the ceramic has to be unloaded from the vessel while leaving just the necessary thickness of the ceramic layer. The point to be noted here is that at the time of unloading, the layer-like soaking region above the ceramic layer has to be kept from being destroyed as much as possible. With a drawer type ash receiving tray, it would be possible to remove the tray thickness worth of the ceramic by a single operation, but the ceramic would sharply sink down at the part which the tray edge passes, so the tray thickness would have to be kept down as much as possible, but once pulling out the tray, the residue discharge gate would be clogged by the ceramic layer, so the tray would de facto be unable to be reinserted into the bottom of the vessel. This is even truer with a large vessel.

Therefore, the residue discharging apparatus is comprised of a winding drive means provided with an endless link chain member traveling along the bottom surface inside the vessel and pushing the ceramic deposited on the bottom surface to a residue discharge gate formed at a bottom end of a third wall connecting the facing first wall and second wall in the surrounding wall. When the links of the endless link chain member are wide links like a caterpillar which span the distance between the first wall and second wall, the endless link chain member covers the bottom surface of the vessel. The wide links can be configured by receiving plates, mesh plates, etc. forming the bottom surface, but the powder ceramic on the links slides along the length of movement of the links, so can be laterally shifted by a shorter distance, therefore the ceramic is gradually unloaded while rubbing against the links. For this reason, the efficiency of unloading the ceramic is low, but there is no phenomenon of partial sharp sinking of the ceramic layer and the layer shape of the soaking layer can be prevented from being damaged in the discharge process. Further, the endless link chain member runs endlessly, so is always in a standby state able to unload the ceramic. For this reason, it does not matter if the unloading efficiency is low. The unloading work need only be continued until the thickness of the ceramic layer becomes optimum.

In the case of wide links, with a deep vessel, a considerable weight of deposited matter presses against the wide links, so a large output power source is required. Further, the links are exposed to the heat inside the vessel and therefore are liable to easily degrade and therefore suffer from problems in durability and reliability. The residue discharging apparatus preferably has a chain drive means provided with a pair of chains oriented along a first ridgeline at which the bottom surface and the inside surface of the first wall intersect and a second ridgeline at which the bottom surface and the inside surface of the second wall intersect and is provided with a raking member at this pair of chains. The raking member in the interval between the first wall and the second wall travels along the bottom surface to laterally shift and rake out the ceramic. It is therefore possible to design a residue discharging apparatus which is simple and superior in durability and reliability. It is also possible to provide a large number of raking members, but since the raking members would be exposed to the heat inside the vessel, replacement work would become troublesome.

Therefore, it is preferable to use two raking members arranged in a positional relationship offset 180° in phase along one length of the pair of chains. When the discharge work is completed, it is possible to stop the pair of raking members at the positions of a pair of sprockets and thereby enable the heat inside the vessel to be released and deterioration of the raking members to be suppressed. Further, since the number of members is small, replacement work becomes easy.

The pair of chains are preferably provided above them with protective covers. This is to prevent ceramic and foreign objects from clogging the distance between the chains and surrounding wall and resulting in an overload state. The first protective cover is a first shield member projecting out from the first wall side, so the second protective cover is preferably a second shield member projecting out from the second wall side.

Further, each raking member may be a bridging chain. By giving the bridging chain some slack and attaching it to the pair of chains, the bridging chain will be pulled along the top of the bottom surface in a bow shape, but even if hitting a foreign object etc., no excessive stress is generated, so a long service life can be realized.

The apparatus is preferably provided with a residue trough extending between the first wall and second wall for receiving the ceramic discharged by said residue discharging apparatus through the residue discharge gate. This makes final disposal of the discharged powder ceramic easier. Further, the apparatus is preferably provided with a feed means for moving the ceramic inside the residue trough to either the direction of the first wall or second wall. Further, final disposal of the discharged powder ceramic becomes even easier. This residue feed means may be made a screw conveyor.

The ceramic inside the vessel has to be discharged while leaving exactly a thickness able to sustain the soaking region, but if the surrounding wall conceals the inside, the soaking region cannot be viewed from the outside. One method would be to provide a viewing window at part of the surrounding wall, but this would end up being fouled by the tar etc. accompanying the dry distillation gas, so the practicality would be poor. Therefore, it is preferable to provide a plurality of temperature sensors along the height direction of the surrounding wall. It is possible to estimate the presence of the soaking region as being between the position of the temperature sensor showing the highest temperature and the position of the temperature sensor showing the second temperature. To eliminate the trouble of a manager reading and ranking the temperature values of the different temperature sensors then calculating the position, it is preferable to provide a level detecting means for detecting the height level of the soaking region based on the temperature information obtained from the plurality of temperature sensors. More preferably, soaking position indicator means indicating the height level of the soaking region at the outside of the surrounding wall based on the detection signals from the level detecting means are provided. Since the height level of the soaking region is constantly indicated at the outside of the surrounding wall, if performing the unloading work while viewing this, it is possible to set the soaking region at an optimal position and to streamline the disposal.

When the level of the top surface of the disposed layer becomes too close to the soaking level and the thickness of the carbonizing layer is shortened, even if loading disposed matter, a sufficient thickness of the carbonizing layer is difficult to form and the soaking region ends up disappearing in some cases. Therefore, it is preferable to provide a top surface position indicator means indicating the level of the top surface of the disposed layer inside the vessel at the outside of the surrounding wall. Since the distance of the level of the top surface to the soaking level can be determined, it is possible to load the disposed matter at the optimal timing and sustain the soaking region.

For example this surface position indicator means is a pulley apparatus. This pulley apparatus has first fixed pulleys supported above the inside space of the vessel and having a wire member having a weight to be placed on the top surface of the disposed layer inside the vessel connected to one end and extending in the vertical direction wound around them, a second fixed pulley supported outside the vessel below a bottom level of the vessel and having the wire member from a first fixed pulley wound around it, a third fixed pulley supported above the inside space of the vessel and having the wire member extending in the vertical direction from the second fixed pulley wound around it, a tension imparting member connected to the other end of the wire member extending from the third fixed pulley in the vertical direction, and an indicator mark provided at the same position as the height level of the weight at the wire member between the second fixed pulley and third fixed pulley. When the top surface of the disposed matter descends along with its reduction in volume, the weight and the indicator mark descend by the same extent, so the position shown by the indicator mark matches with the position of the top surface of the disposed matter. The only members inside the vessel are the weight and the wire member connected to it. Even if the wire member has tar etc. deposited on it, it can be removed by its vertical movement.

Note that the final disposal apparatus of the dry distillation gas is preferably provided with at least a carbonization solution tank for condensing the dry distillation gas taken out to the outside of the dry distillation vessel to a carbonization solution and a cooling apparatus for cooling the residual gas taken out from this carbonization solution tank without allowing it to contact the outside air.

Effects of the Invention

According to the present invention, it is possible to reliably form a soaking region of disposed matter and stably sustain that soaking region even in a relatively large volume dry distillation vessel and possible to provide a practical apparatus greatly improved in disposal capability.

BRIEF DESCRIPTION OF THE DRAWINGS

[FIG. 3] (A) A plan view of the smoldering type volume reducing disposal apparatus for garbage, and (B) a front view of the smoldering type volume reducing disposal apparatus for garbage.

[FIG. 5] (A) A side view of the state of mounting of an air feed pipe of negative ion air in the apparatus, (B) a plan view of the same, and (C) a perspective view of the appearance of a negative ion generation unit to be attached to the air feed pipe.

[FIG. 6] (A) An explanatory view of a chain drive apparatus for discharge of residue in the smoldering type volume reducing disposal apparatus for garbage, and (B) a partial view of a bridging chain attached to drive chains.

[FIG. 9] (A) An explanatory view of an evening apparatus able to be used in the smoldering type volume reducing disposal apparatus for garbage, and (B) an explanatory view of a top surface position indicator for garbage able to be used in the smoldering type volume reducing disposal apparatus for garbage.

[FIG. 11] A plan view of the smoldering type volume reducing disposal apparatus for garbage.

Figure 1:
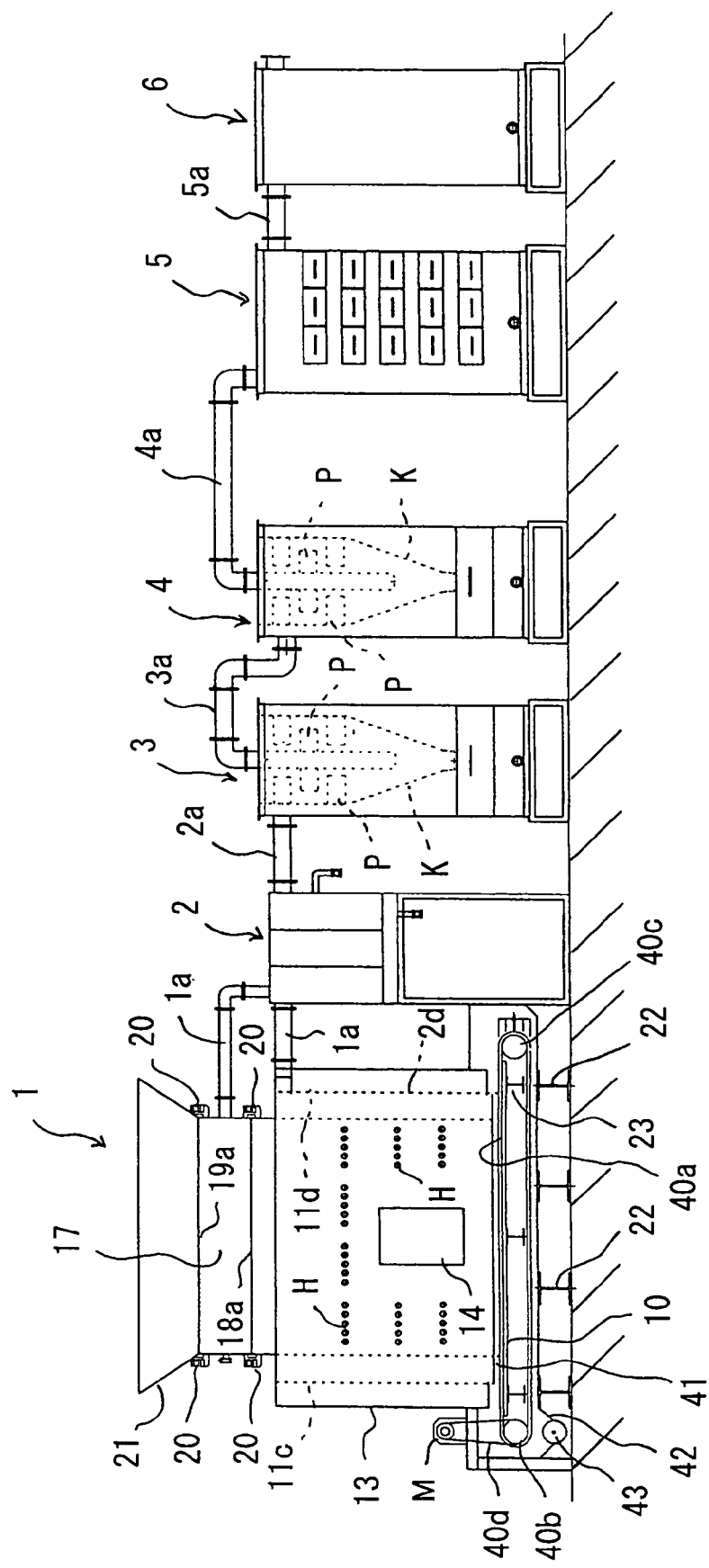
[FIG. 1] A front view of a smoldering type volume reducing disposal apparatus for garbage and a final disposal apparatus according to a first embodiment of the present invention garbage.

DESCRIPTION OF NOTATIONS 1, 1' . . . smoldering type volume reducing disposal apparatus for garbage
1a . . . exhaust duct
2 . . . acetic acid tank
2a, 3a, 4a, 5a . . . duct
3, 4 . . . cyclone apparatus
5 . . . adsorption deodorization apparatus
6 . . . photo catalyst apparatus
10 . . . bottom plate
11 . . . surrounding wall
11a . . . first wall
11b . . . second wall
11c . . . third wall
11d . . . fourth wall 12 . . . intermediate wall
13 . . . outside wall
14 . . . inspection door
15 . . . top loading port
16 . . . top surface of dry distillation vessel
17 . . . rectangular frame
18a, 18b . . . inside lid plate
19a, 19b . . . outside lid plate
20 . . . oil pressure cylinder
21 . . . drop hopper
22 . . . H-steel seat
23, 51 . . . H-steel beam
30 . . . blower
40a . . . drive chain
40b . . . drive sprocket
40c . . . driven sprocket
40d . . . roller chain
40e . . . tension rod
40f . . . fastening plate
40g . . . nut
40h . . . bridging chain
40i . . . coupling fitting
41 . . . shield member
50 . . . columnar station
50a . . . umbrella part
60 . . . level detection apparatus
61 to 64 . . . lamp
70a, 70b . . . raking member
71 . . . main weight
72 . . . wire member
73, 74 . . . first fixed pulley
75 . . . second fixed pulley
76 . . . third fixed pulley
77 . . . secondary weight
78 . . . arrow member
A . . . unit body
$G_1$ . . . entry gate
$G_2$ . . . residue discharge gate
H . . . air feed hole
h . . . small holes
K . . . cyclone
$L_1$ . . . first ridgeline
$L_2$ . . . second ridgeline
N . . . pin-shaped negative electrode
P . . . condensation plate
Q . . . conduit
W . . . air feed pipe
S . . . temporary storage space
$S_1$ to $S_4$ . . . temperature sensor
$T_1$ . . . powder ceramic layer
$T_2$ . . . charcoal layer
$T_3$ . . . sawdust layer
$T_{31}$ . . . provisional carbonizing layer
$T_{32}$ . . . provisional drying layer
U . . . negative ion generation unit
V . . . disposed layer
$V_1$ . . . drying layer
$V_2$ . . . carbonizing layer
$V_3$ . . . soaking region

BEST MODE FOR WORKING THE INVENTION

Next, embodiments of the present invention will be explained with reference to the attached drawings.

First Embodiment

Figure 2:
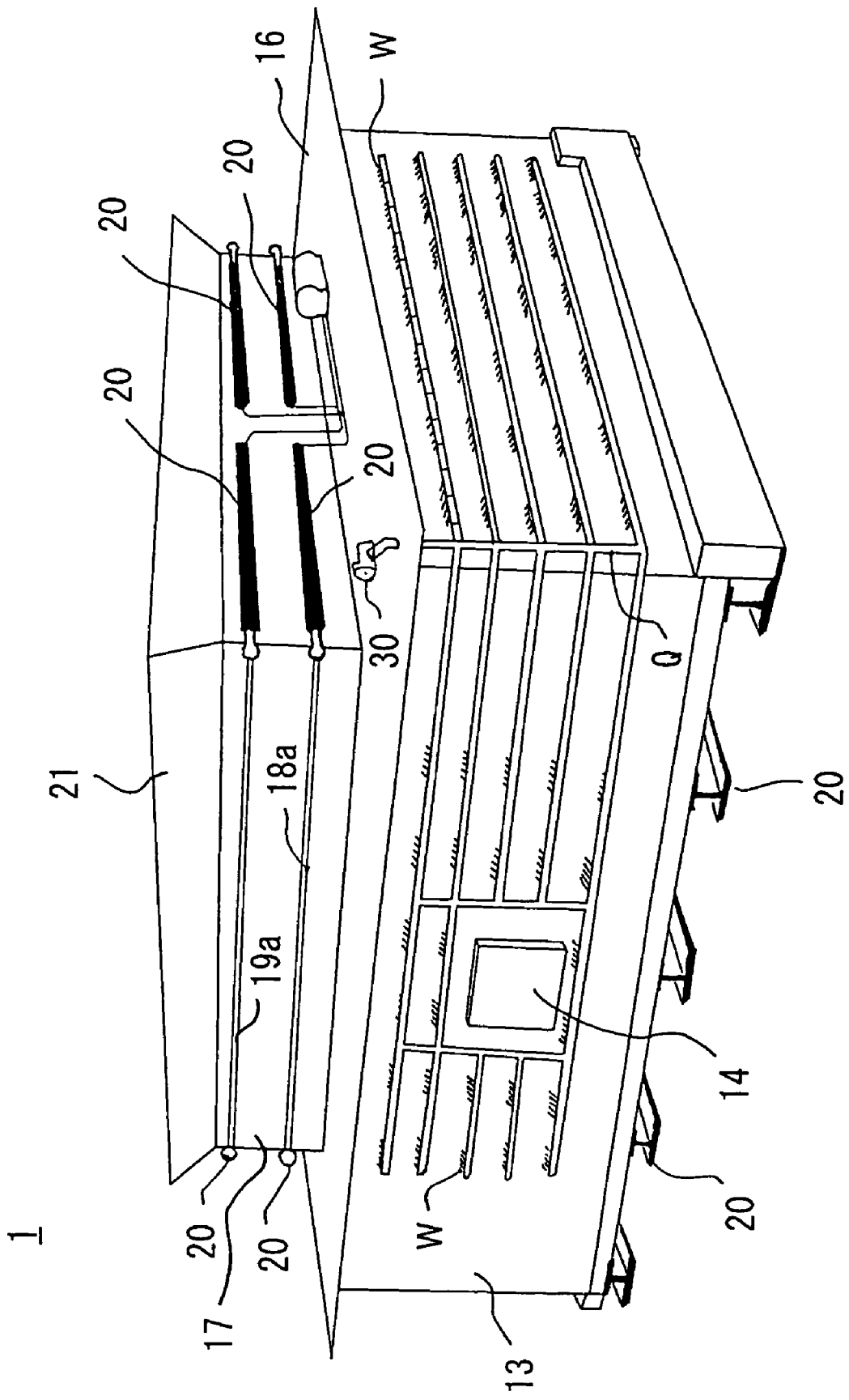
[FIG. 2] An external perspective view of a smoldering type volume reducing disposal apparatus for garbage.
Figure 4:
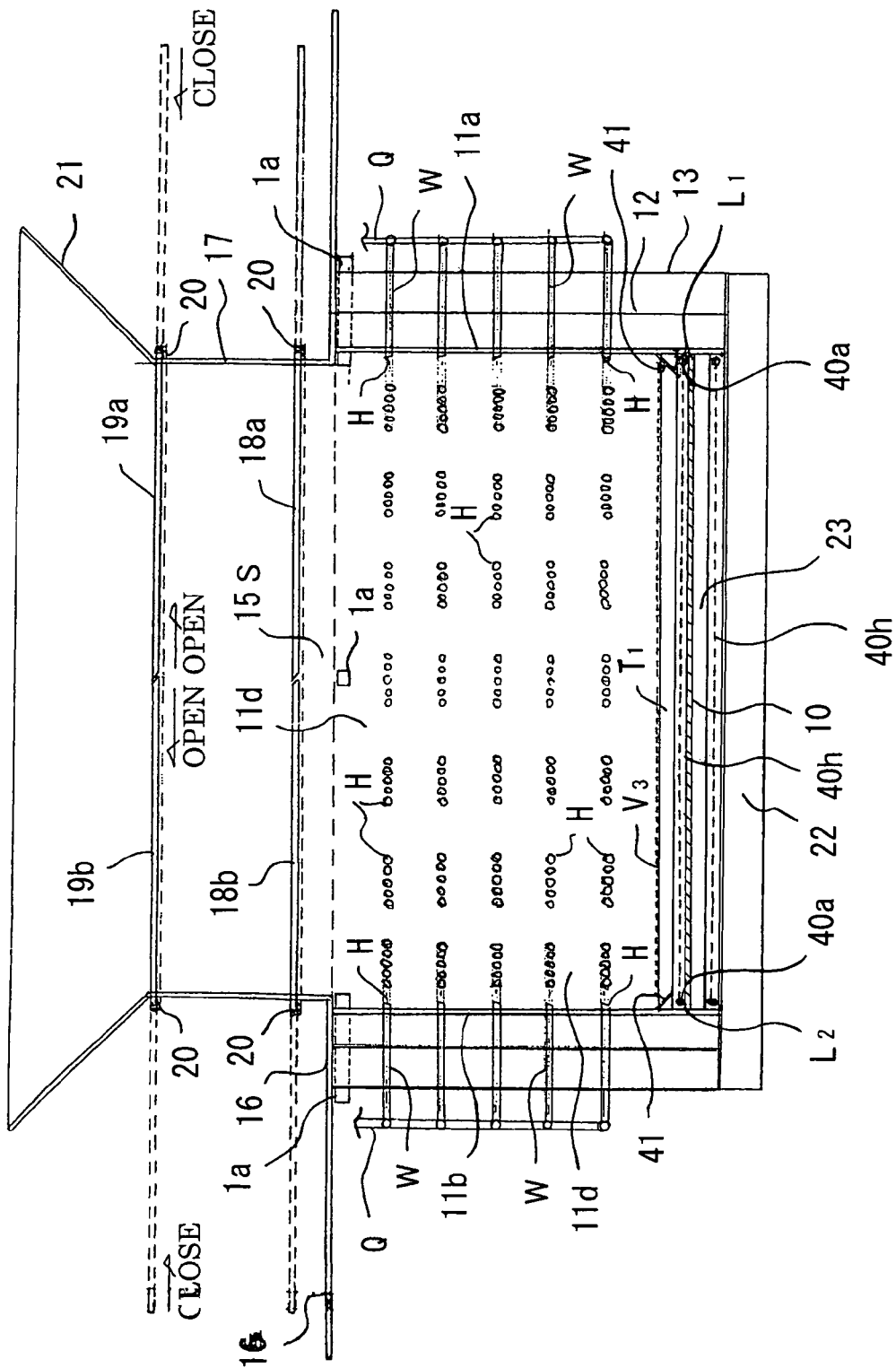
[FIG. 4] A sectional view of the smoldering type volume reducing disposal apparatus for garbage.

FIG. 1 is a front view of a smoldering type volume reducing disposal apparatus for garbage and a final disposal apparatus according to a first embodiment of the present invention gar-bage, FIG. 2 is an external perspective view of a smoldering type volume reducing disposal apparatus for garbage, FIG. 3(A) is a plan view of the smoldering type volume reducing disposal apparatus for garbage, FIG. 3(B) is a front view of the smoldering type volume reducing disposal apparatus for garbage, and FIG. 4 is a sectional view of the smoldering type volume reducing disposal apparatus for garbage.

This example is provided with a volume reducing disposal apparatus 1 for garbage, an acetic acid tank 2 for condensing dry distillation gas (smoldering gas) taken out from the top of the inside space through an exhaust duct 1a, a first cyclone apparatus 3 for forcibly cooling and liquefying the residual gas taken out from a duct 2a without allowing contact with the outside air, a second cyclone apparatus 4 for forcibly cooling and liquefying residual gas taken out from a duct 3a without allowing contact with the outside air, an adsorption deodorization apparatus 5 for trapping particulate matter in the residual gas taken out through a duct 4a using zeolite, and a photo catalyst apparatus 6 for removing the odor of the residual gas introduced through a duct 5a using a photo catalyst. Note that each of the cyclone apparatus 3 and the cyclone apparatus 4 has a plurality of condensation plates P in a cyclone K. These condensation plates P are run through by a coolant supplied from a not shown chilling unit and cause condensation of the water vapor in the residual gas in the cyclone K.

The volume reducing disposal apparatus 1 is configured as dry distillation vessel elliptical in cross-section comprised of a bottom plate 10, a surrounding wall 11 forming the inside wall (front wall (first wall)) 11a, back wall (second wall) 11b, left curved wall (third wall) 11c, and right carved wall (fourth wall) 11d). The surrounding wall is surrounded outside by an intermediate wall 12. Further, the intermediate wall 12 is surrounded outside by an outside wall 13. The front surface of the outside wall 13 is provided with an inspection door 14 sealing an inspection port of a size enabling entry by a worker.

At the inside of the surrounding wall 11 (11a, 11b, 11c, and 11d), a large number of air feed holes H for continuously blowing in negative ions are arranged dispersed. Each air feed hole H prevents the entry of said disposed matter or tar etc. into the port along with settling movement of the disposed layer in the vessel by having an edge with an upper side projecting outward from lower side of the edge to form an inclined opening. The air feed pipes W connecting to the air feed holes H, as shown in FIGS. 5(A) and (B), pass through the surrounding wall 11, the intermediate wall 12, and the outside wall 13. At the air feed pipes W at positions near the outside of the outside wall 13, a negative ion generation unit U is provided for each air feed hole H. In this embodiment, five air feed holes H form one set. These are arranged in three to five levels in the vertical direction at 30 cm intervals.

The negative ion generation unit U used in this embodiment is an Andes Electric inti-f ion generation unit (model ITM-F201). As shown in FIG. 5(C), this is an electron discharge type having a flat small sized unit body A and a pin-shaped negative electrode (pure carbon needle) N projecting out from this body and suppressing formation of unnecessary electromagnetic waves. The unit body A is attached on the corresponding air feed pipe W, while the pin-shaped negative electrode N is inserted into the air feed pipe W through a small hole h formed in the pipe wall so as to face the downstream side of the feed of air in said pipe W. Each air feed pipe W is a branch pipe communicating with and branched from a conduit Q of a blower 30 blowing in outside air through a filter. Note that the pin-shaped negative electrode N projecting out from the unit body A is not limited to a single pin. Two or more may be used as well.

The top loading port 15 of the dry distillation vessel is provided with a double lid structure. This double lid structure is comprised of a rectangular frame 17 rising from the top surface 16 of the dry distillation vessel and provided with twin inside lid plates 18a, 18b slidable in the horizontal direction and twin outside lid plate 19a, 19b provided above the inside lid plates 18a, 18 to form a temporary storage space S for the disposed matter and slidable in the horizontal direction. The lid plates 18a, 18b, 19a, and 19b are driven to open and close by a part of oil pressure cylinders 20, 20 provided at their two sides. Further, the square frame 17 is provided above it with a drop hopper 21.

The front side and the back side of the intermediate wall 12 and outside wall 13 are supported on a plurality of H-steel seats 22. A bottom plate 10 is fastened on a plurality of H-steel beams 23 connecting the first wall 11a and the second wall 11b. The bottom ends of the right surfaces and the left surfaces of the third wall 11c and fourth wall 11d and the intermediate wall 12 and outside wall 13 are raised above the bottom plate 10, whereby an entry gate $G_1$ for the drive chains 40a positioned above and a residue discharge gate $G_2$ forming an exit gate are formed. The pair of drive chains 40a, 40a are arranged along a first ridgeline $L_1$ at which the bottom plate 10 and the inside surface of the first wall 11a intersect and a second ridgeline $L_2$ at which the bottom plate 10 and the inside surface of the second wall 11b intersect. As shown in FIG. 6(A), each drive chain 40a is engaged with a drive sprocket 40b and a driven sprocket 40c. The upper (tension side) drive chain 40a is pulled along the bottom plate 10 inside the vessel, while the lower (slack side) drive chain 40a passes through the lower space of the H-steel beams 23. The drive sprocket 40b is driven via a roller chain 40d by the motor M. The axial center of the driven sprocket 40c has a tension rod 40e connected to it. This tension rod 40e passes through the fastening plate 40f and is screwed into a nut 40g. The extent of fastening with this nut 40g enables movement of the tension rod 40e and adjustment of the tension of the drive chain 40a. The pair of drive chains 40a, 40a, as shown in FIG. 6(B), are connected by raking members constituted by bridging chains 40h by coupling fittings 40i. There are two bridging chains 40h which are arranged in a positional relationship offset 180° in phase along one length of the pair of chains 40a, 40a.

Directly above the drive chain 40a above the bottom plate 10, a protective cover constituted by a shield member 41 is provided. This shield member 41, as shown in FIG. 4, projects out from the first wall 11a and second wall 11b at a downward incline. Directly under the residue discharge gate $G_2$, a residue trough 42 spanning the distance between the first wall 11a and second wall 11b is provided for receiving the powder ceramic $T_1$. Further, this residue trough 42 is provided inside it with a screw conveyor 43 for moving the powder ceramic $T_1$ laterally in either the direction of the first wall 11a or second wall 11b to discharge it from the trough.

Figure 7:
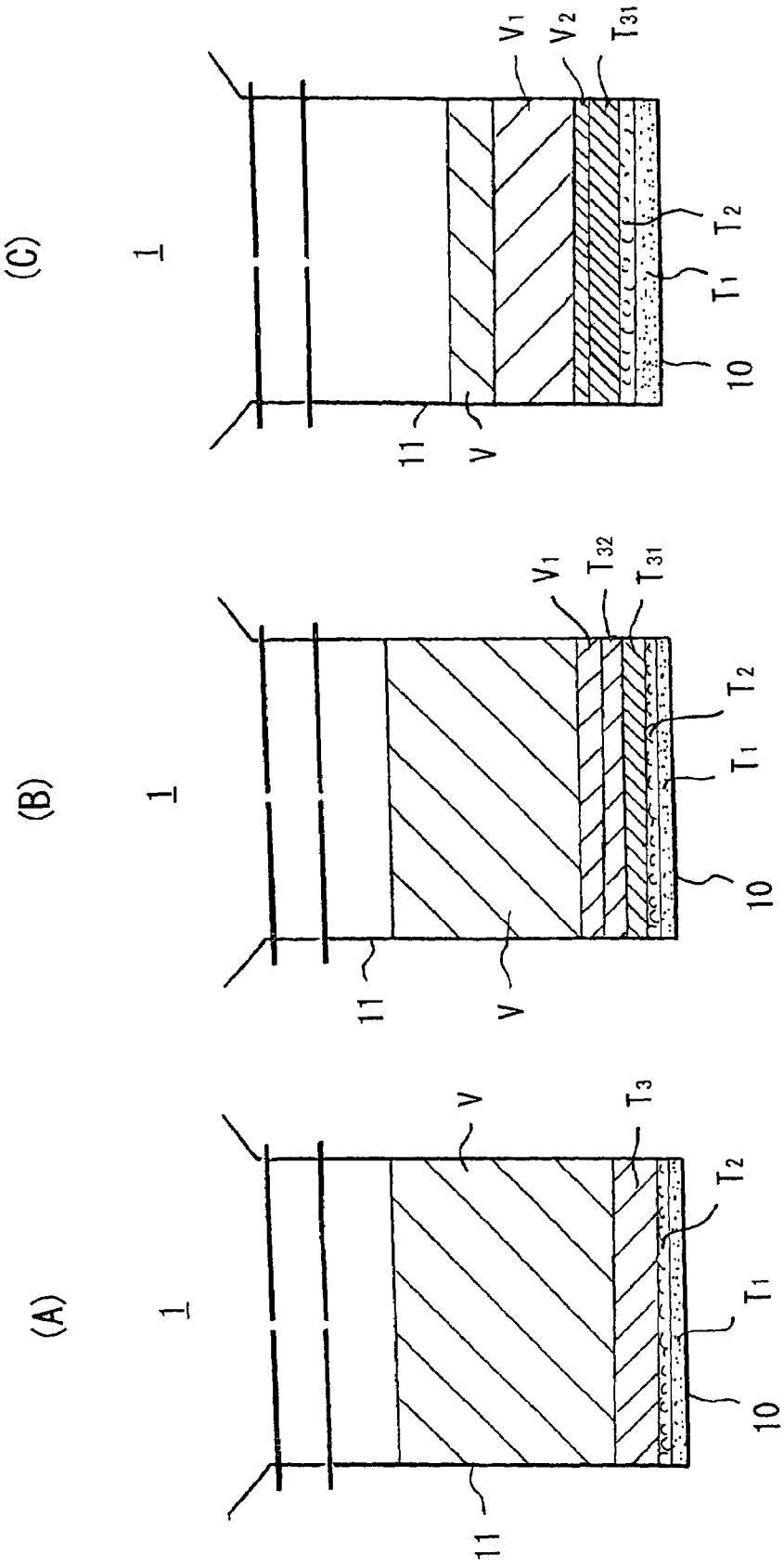
[FIG. 7] (A) to (C) Step diagrams of the preparatory process for forming a soaking region in garbage loaded into the smoldering type volume reducing disposal apparatus for garbage.

In operating the volume reducing disposal apparatus 1 of this embodiment, as preparatory stage, as shown in FIG. 7(A), first, negative ion air is blown in from the air feed holes H, in that state, a charcoal layer $T_2$ of charcoal is evenly laid over a 15 to 20 cm thick powder ceramic layer $T_1$, the inside lid plates 18a, 18b and outside lid plates 19a, 19b are closed, it is waited until the powder ceramic layer $T_1$ is preheated, then a sawdust layer $T_3$ is loaded and laid over it, then, after the elapse of about 15 minutes, a disposed layer V of organic garbage is loaded. When using the provisional soaking region of the charcoal layer $T_2$ to preheat the powder ceramic layer $T_1$, the powder ceramic layer $T_1$ acts to store the heat and simultaneously to radiate heat, so, as shown in FIG. 7(B), the sawdust layer $T_3$ changes to a provisional carbonizing layer $T_{31}$ and a provisional drying layer $T_{32}$, the provisional soaking region gradually proceeds upward, and the bottom side of the disposed layer V also changes to a drying layer $V_1$, so, as shown in FIG. 7(C), a carbonizing layer $V_2$ is also formed. Finally, this carbonizing layer $V_2$ catches fire and a soaking region $V_3$ (see FIG. 4) is formed in a layer whereby smoldering disposal of the disposed layer V begins. Further, the inside of the dry distillation vessel is a negative ion atmosphere, so when it is possible to suppress flame combustion of sawdust when loading the sawdust.

In the volume reducing disposal apparatus 1 of this embodiment, the surrounding wall 11 is provided with a large number of air feed holes H, so the air feed holes H can be made suitably small in size and the flow rate can be strengthened relatively by that amount. Further, when the disposed matter gradually sinks in the vessel and approaches the air feed holes H, it can be blown away to prevent clogging of the air feed holes H. Further, deposition of tar etc. at the air feed holes H can be suppressed. Further, since a large number of air feed hole H are arranged dispersed, even if any air feed holes H happen to become clogged, the remaining air feed holes H can supply negative ion air and therefore the soaking region $V_3$ can be stably sustained. Further, even if the vessel is deep and the level of the soaking region $V_3$ rises, negative ion air is fed from the nearby air feed holes H, so the soaking region $V_3$ can be stably sustained. Further, the soaking region $V_3$ is supplied with negative ions rising upward from the powder ceramic layer $T_1$ and negative ions supplied from the surrounding large number of air feed holes H to the center direction no matter what the height level, so the soaking region $V_3$ can be stably sustained. For this reason, a deep dry distillation vessel can be used, a large volume volume reducing disposal apparatus 1 suitable for a practical apparatus can be realized, the frequency of loading the disposed matter can be reduced, and operational control can be simplified.

The surrounding wall 11 is elliptical in cross-sectional shape. Toward the third wall 11c and toward the fourth wall 11d, an air cavity or a thin layer of disposed matter is formed, so negative ion air has a good reach and the disposed layer is surrounded by negative ion air. For this reason, flame combustion of the disposed layer can be suppressed.

In this embodiment, each air feed hole H is provided with a negative ion generation unit U at a position near the outside of the surrounding wall 11. Since negative ion air from a single negative ion generator is not branched and fed to a large number of air feed holes, it is possible to raise the concentration of negative ions blown from each air feed hole H into the vessel. This contributes to stably sustaining the soaking region. Further, since the negative ion generation unit U is provided at a position near the outside of the surrounding wall 11, the front end of the pin-shaped negative electrode N can be brought close to the air feed hole H, the flight distance of the discharged electrons inside the vessel can be minimized, and the injection efficiency can be improved. This contributes to stably sustaining the soaking region. Further, the body A of the negative ion generation unit U is attached to the air feed pipe W and the pin-shaped negative electrode N projecting out from the body A is inserted through a small hole h formed at the wall of the air feed pipe W into the pipe facing the downstream side of the fed air. The pin-shaped negative electrode N has a certain extent of directivity of the electron discharge, so it is possible to make the discharged electrons proceed from the front end of the pin-shaped negative electrode N to the inside of a cubic space near the air feed hole H and consequently possible to raise the rate of entry into the vessel and ionization of the oxygen atoms engaged in thermal motion. For this reason, the ionization efficiency rises, and a high concentration of negative ions cap be supplied. This contributes to stably sustaining the soaking region $V_3$. Further, the front end of the pin-shaped negative electrode N is exposed to the fed air comprised of outside air in the air feed pipe W, so gradually becomes contaminated and is liable to drop in electron discharge ability, but the pin-shaped negative electrode N can be taken out from the small hole h of the air feed pipe W, so can be easily periodically cleaned.

Each air feed pipe W is a branch pipe connected to a conduit Q of a blower 30 blowing outside air in through a filter (not shown). If providing a fan motor or other small sized blowing means at the negative ion generation unit U of each air feed pipe W, power lines at nearby locations are sufficient, so production of the volume reducing disposal apparatus 1 becomes easy, but each small sized blowing means has to be provided with a filter, so the maintenance cost for filter replacement ends up rising. However, if using a plurality of branched pipes, while the production costs rise by the amount of trouble in the pipe laying work, but just a single filter need be provided at a central blower 30, so filter replacement and other maintenance can be greatly reduced.

In this embodiment, when loading disposed matter, first the outside lid plates 19a, 19b are opened and the disposed matter is loaded into the temporary storage space S above the inside lid plates 18a, 18b to await deposition, then the outside lid plates 19a, 19b are closed, whereupon the disposed matter in the temporary storage space S drops into the vessel to add to the pile. Due to this double lid structure, the dry distillation gas inside the vessel can be kept from being released into the outside air and the outside air can be kept from entering the vessel causing flame combustion. Further, if preloading disposed matter in the temporary storage space S before the work of adding to the pile of the disposed matter, it is possible to have the large moisture content disposed matter etc. drained and dried in advance by the heat of conduction and waste heat from the bottom whereby the disposal time can be shortened. Since the inside lid plates 18a, 18b form a sliding door-like lid which can be slid in the horizontal direction, the disposed matter in the temporary storage space S can be piled up in advance in a layer manner, so in the process of gradually opening the inside lid plates 18a, 18b, the disposed matter drops from the edges of the inside lid plates 18a, 18b moving in the horizontal direction into the surrounding wall 11 and consequently the increased disposed matter becomes generally layer shaped.

Here, to even the disposed matter loaded into the surrounding wall 11, for example, raking members 70a, 70b shown in FIG. 9(A) may be provided below the inside lid plates 18a, 18b. By opening/closing the inside lid plates 18a, 18b, the raking members 70a, 70b can rake even the top of the disposed matter V coupled with that operation.

In this embodiment, when discharging the residue, if driving the drive chains 40a, 40a, the bridging chains 40h provided between them travel over the top of the bottom plate 10 to laterally shift and rake out the powder ceramic layer $T_1$ to the residue discharge gate $G_2$. By giving the bridging chains 40h some slack and attaching them to the pair of chains 40a, 40a, the bridging chains 40h will be pulled along the top of the bottom surface in a bow shape, but even if hitting a foreign object etc., no excessive stress is generated, so a long service life can be realized. Further, two bridging chains 40h may be used arranged in a positional relationship offset 180° in phase along one length of the pair of drive chains 40a, 40a. When the discharge work is completed, it is possible to stop the pair of drive chains 40a, 40a at the position of the drive sprocket 40b or driven sprocket 40c and thereby enable the heat inside the vessel to be released. The pair of chains 40a are provided above them with shield members 41, so it is possible to prevent ceramic and foreign objects from clogging the distance between the drive chains 40a and the first wall 11a or the second wall 11b and resulting in an overload state.

Figure 8:
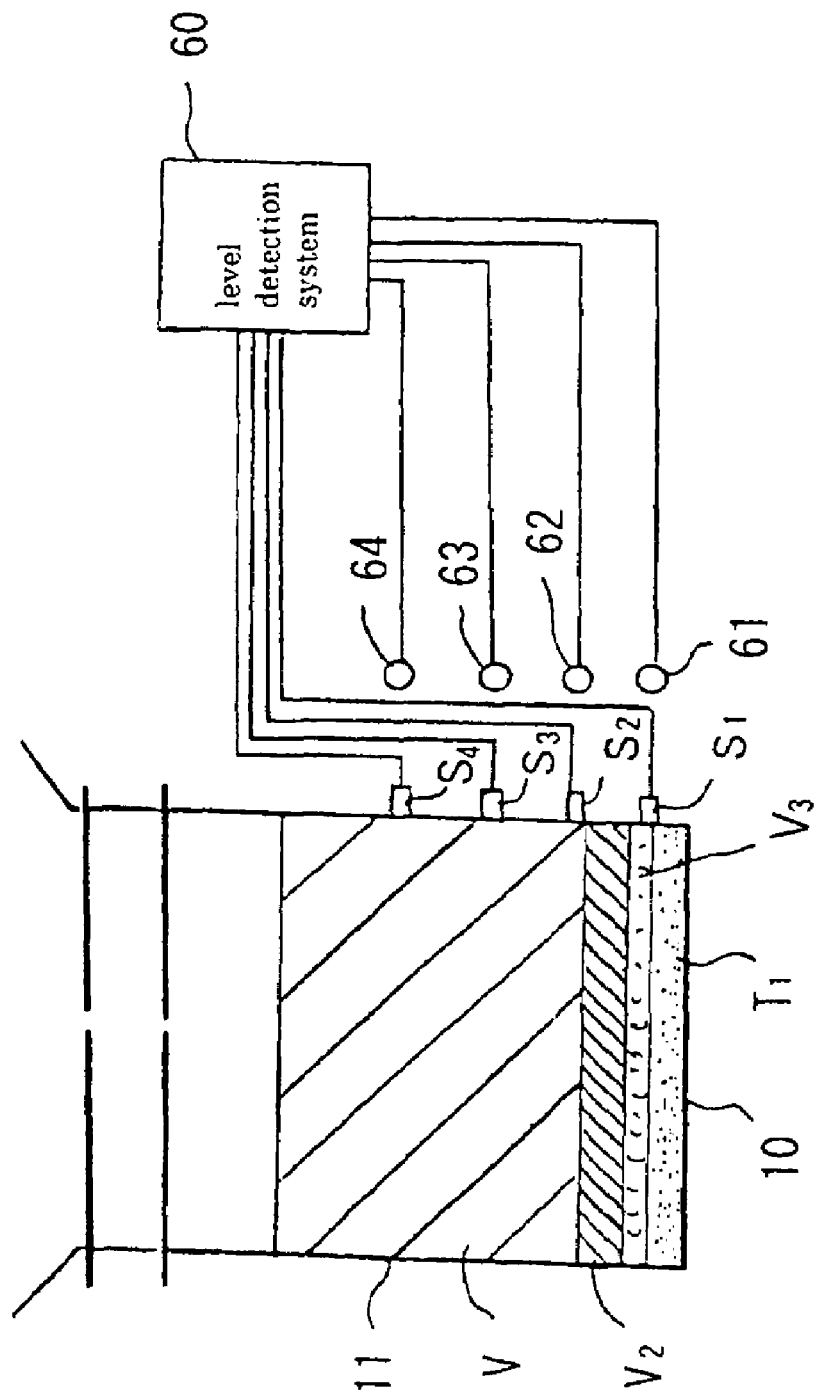
[FIG. 8] An explanatory view of a soaking position indicator for garbage able to be used in the smoldering type volume reducing disposal apparatus for garbage.

Here, the powder ceramic layer $T_1$ inside the vessel has to be discharged while leaving exactly a thickness able to sustain the soaking region $V_3$, but if the surrounding wall 11 conceals the inside, the soaking region $V_3$ cannot be viewed from the outside. Therefore, as shown in FIG. 8, it is preferable to provide a plurality of temperature sensors $S_1$ to $S_4$ along the height direction of the surrounding wall 11. In the case shown in FIG. 8, it is possible to estimate the presence of the soaking region $V_3$ as being between the position of the temperature sensor $S_1$ showing the highest temperature and the position of the temperature sensor $S_2$ showing the second temperature. To eliminate the trouble of a manager reading and ranking the temperature values of the different temperature sensors $S_1$ to $S_4$ then calculating the position, provision is made of a level detection apparatus 60 for detecting the height level of the soaking region $V_3$ based on the temperature information obtained from the plurality of temperature sensors $S_1$ to $S_4$. This level detection apparatus 60 can be configured by a microcomputer. Further, soaking position indicators constituted by lamps 61 to 64 are provided for indicating the height level of the soaking region $V_3$ outside of the surrounding wall based on the detection signals from this level detection apparatus 60. Since the position of the lit lamp is understood as the height level of the soaking region $V_3$, if performing the unloading work while viewing this, it is possible to set the soaking region $V_3$ at an optimal position and to streamline the disposal.

Further, when the top surface level of the disposed layer overly approaches the soaking level and the layer thickness of the carbonizing layer becomes shorter, even if the disposed matter is charged, a sufficient thickness of the carbonizing layer is difficult to form and the soaking region ends up disappearing in some cases. Therefore, as shown in FIG. 9(B), outside the surrounding wall 11, a top surface position indicator apparatus indicating the level of the top surface of the disposed layer in the vessel is provided. This surface position indicator apparatus is comprised of first fixed pulleys supported above the inside space of the vessel and having a wire member having a main weight 71 to be placed on the top surface of the disposed layer inside the vessel connected to one end and extending in the vertical direction wound around them, a second fixed pulley 75 supported outside the vessel below a bottom level of the vessel and having the wire member 72 from the first fixed pulley 74 wound around it, a third fixed pulley 76 supported above the inside space of the vessel and having the wire member 72 extending in the vertical direction from the second fixed pulley 75 wound around it, a tension imparting member constituted by a secondary weight 77 connected to the other end of the wire member 72 extending from the third fixed pulley 76 in the vertical direction, and an arrow member 78 provided at the same position as the height level of the main weight 71 at the wire member 72 between the second fixed pulley 75 and third fixed pulley 76. When the top surface of the disposed matter descends along with its reduction in volume, the main weight 71 and the arrow member 78 descend by the same extent, so the position shown by the arrow member 78 matches with the position of the top surface of the disposed matter. The only members inside the vessel are the main weight 71 and the wire member 72 connected to it. Even if the wire member 72 has tar etc. deposited on it, it can be removed by its vertical movement.

Second Embodiment

Figure 10:
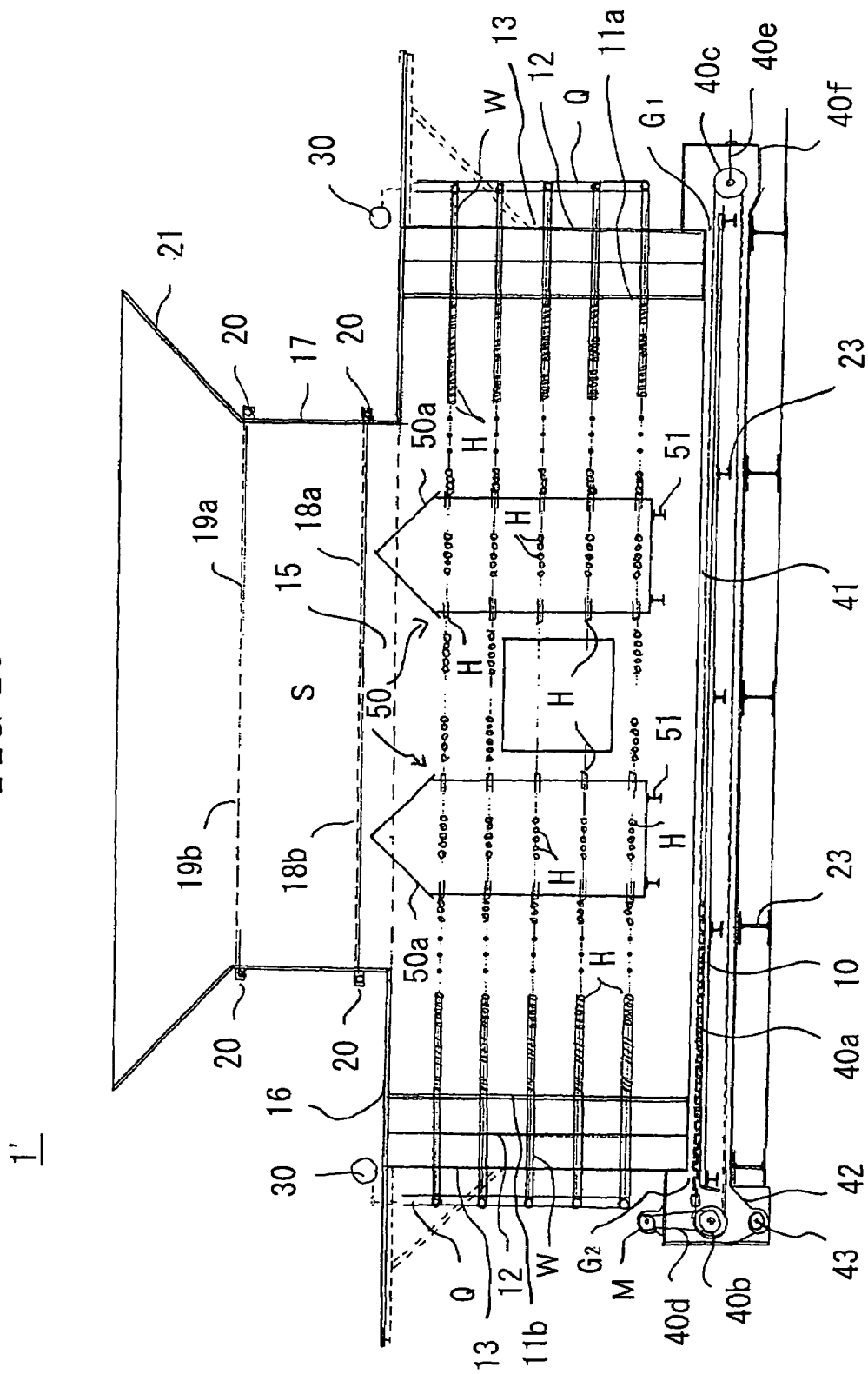
[FIG. 10] A sectional view of a smoldering type volume reducing disposal apparatus for garbage according to a second embodiment of the present invention.

FIG. 10 is a sectional view of a smoldering type volume reducing disposal apparatus for garbage according to a second embodiment of the present invention, while FIG. 11 is a plan view of the smoldering type volume reducing disposal apparatus for garbage. In FIG. 10 and FIG. 11, parts the same as the parts shown in FIG. 1 to FIG. 6 are not explained.

The volume reducing disposal apparatus 1' of this example has a dry distillation vessel having a large bottom surface area. At the inside of the surrounding wall 11, an independent columnar station 50 separated from said surrounding wall 11 is provided. This columnar station 50 is supported at its two ends by the first wall 11a and the second wall 11b and is fixed on H-steel beams 51 separated from the bottom plate 10. To prevent disposed matter from being deposited on top of it, it has an umbrella part 50a at its top. The columnar station 50 is provided with a large number of air feed holes H arranged dispersed on its outside. Negative ion air is fed to air feed pipes W having air feed holes H through a duct (not shown) running along the H-steel beams 51.

By providing one or more of these columnar stations 50 near the center of the vessel, it is possible to sustain the soaking region near the center of the vessel by blowing negative ion air from the large number of air feed holes H at the outside surface. For this reason, it is possible to employ a vessel with a large bottom surface area and possible to realize a large volume practical apparatus.

Note that the invention is not limited to the case of provision of the columnar station 50. It is also possible to employ a configuration dividing the inside of the vessel in the vertical direction by a partition and arranging a large number of air feed holes dispersed at the outside of that partition.

INDUSTRIAL APPLICABILITY

As the disposed matter able to be disposed of by smoldering according to the present invention, food residue (vegetable scraps, food past the expiration date, squeezed lees, etc.), wood scraps, paper, carton boxes, incinerated ash, dehydrated sludge or rubber, polyvinyl chloride, plastics, paint residue, farm use plastic sheet, etc. The invention is suitable for closed system reduction of volume and disposal not discharging any exhaust gas.

The invention claimed is:

1. In a method of disposing of material using a dry distillation vessel having surrounding walls forming a chamber, including:
   introducing air including negative ions into the chamber of the vessel, the dry distillation vessel containing, from a bottom, a ceramic layer and a disposed layer, while retaining a soaking region between the ceramic layer and a carbonizing layer of the disposed layer, and the soaking region advances to the top of the disposed layer; and
   dry distilling the disposed layer, and discharging resultant dry distillation gas outside the vessel, while producing ash in the soaking region that is converted to powder ceramic and provides a part of the ceramic layer, and while the disposed layer gradually sinks by its own weight so as to reduce the volume thereof;
   the improvement comprising placing a tinder material over the ceramic layer which includes a provisional soaking region at the bottom surface thereof, while feeding negative ion air, from air feed holes in the surrounding walls of the vessel, and then depositing disposed material on the tinder material.

2. A method of disposing of material as set forth in claim 1, characterized in that said tinder material has a charcoal, coke, or another charcoal layer packed over the ceramic layer and a layer of sawdust, wood chips, or other combustible matter laid over the charcoal layer.

3. A smoldering type volume reducing disposal system comprising a dry distillation vessel, having surrounding walls, forming a chamber into which air including negative ions is introduced, arranged to contain a ceramic layer and disposed layer packed from the bottom of the vessel, sustaining a soaking region between the ceramic layer and a carbonizing layer changing in a bottom surface in the disposed layer, and thereby reducing the volume of said disposed layer, wherein a large number of air feed holes are arranged, dispersed at the inside of said surrounding walls of the vessel, to blow the air including negative ions into the chamber of the vessel, air feed pipes are provided connected to the air feed holes and pass through the surrounding wall, and negative ion generation units are provided in the air feed pipes outside and adjacent the surrounding walls, arranged to charge the air being fed in the air feed pipes with negative ions.

4. A smoldering type volume reducing disposal system as set forth in claim 3, characterized in that said dry distillation vessel has a columnar body inside said surrounding wall separated from said surrounding wall and has said large number of air feed holes arranged dispersed at the outside surface of this columnar body.

5. A smoldering type volume reducing disposal system as set forth in claim 3, characterized in that said dry distillation vessel has a partition dividing its inside space in the vertical direction and has said large number of air feed holes arranged dispersed at the outside surface of said partition.

6. A smoldering type volume reducing disposal system as set forth in claim 3, characterized in that said air feed holes are provided with blocking means for preventing the entry of said disposed matter inside the holes during settling movement of said disposed layer.

7. A smoldering type volume reducing disposal system as set forth in claim 3, characterized in that said feed holes have edges with upper sides projecting outward from lower sides of the edges to form inclined openings.

8. A smoldering type volume reducing disposal system as set forth in claim 3, characterized in that a body of the negative ion generation unit is attached to the air feed pipe and a pin-shaped negative electrode projecting out from the unit is inserted through a small hole formed at a wall of the air feed pipe into the pipe facing the downstream side of the fed air.

9. A smoldering type volume reducing disposal system as set forth in claim 3, characterized in that the air feed pipe is a branch pipe connected to a conduit of a blower blowing outside air in through a filter and branched into one or more sections.

10. A smoldering type volume reducing disposal system as set forth in claim 3, including an inside lid provided at a top loading side of the vessel and a spaced outside lid provided above the inside lid which spaced inside and outside lids create a temporary storage space for disposed matter.

11. A smoldering type volume reducing disposal system as set forth in claim 10, characterized in that said inside lid is a sliding door lid which can be slide in the horizontal direction.

12. A smoldering type volume reducing disposal system as set forth in claim 11, characterized in that said sliding door lid is a pair of lids able to slide in different directions.

13. A smoldering type volume reducing disposal system as set forth in claim 10, including a drop hopper positioned above the outside lid.

14. A smoldering type volume reducing disposal system as set forth in claim 3, including an evening means for raking and leveling the surface of the disposed matter within the vessel after being loaded from above the vessel.

15. A smoldering type volume reducing disposal system as set forth in claim 14, characterized in that said evening means operates coupled with a lid provided at a top loading port of the vessel.

16. A smoldering type volume reducing disposal system as set forth in claim 3, including a residue discharging system, the residue discharging system comprised of a winding drive means provided with an endless link chain member carrying ceramic deposited on the bottom surface inside the vessel along a bottom surface to a residue discharge gate formed at a bottom end of a third wall connecting a facing first wall and second wall in the surrounding wall.

17. A smoldering type volume reducing disposal system as set forth in claim 16, including a residue trough extending between the first wall and second wall for receiving the ceramic discharged by said residue discharging system through the residue discharge gate.

18. A smoldering type volume reducing disposal system as set forth in claim 17, including a residue feed means for moving the ceramic inside the residue trough to either the direction of the first wall or second wall.

19. A smoldering type volume reducing disposal system as set forth in claim 18, characterized in that said residue feed means is a screw conveyer.

20. A smoldering type volume reducing disposal system as set forth in claim 3, including a residue discharge gate formed at a bottom end of a third wall connecting a facing first wall and second wall in the surrounding wall and a residue discharging system, the residue discharging system having a chain drive means provided with a pair of chains oriented along a first ridgeline at which a bottom surface and an inside surface of the first wall intersect and a second ridgeline at which the bottom surface and an inside surface of the second wall intersect the pair of chains being provided with a raking member.

21. A smoldering type volume reducing disposal system as set forth in claim 20, including two raking members arranged in a positional relationship offset 180° in phase along one length of the pair of chains.

22. A smoldering type volume reducing disposal system as set forth in claim 21, including protective covers arranged above said pair of chains.

23. A smoldering type volume reducing disposal system as set forth in claim 22, wherein a first protective cover is a first shield member projecting out from the first wall side, and the second protective cover is a second shield member projecting out from the second wall side.

24. A smoldering type volume reducing disposal system as set forth in claim 20, charactized in that said raking member is a bridging chain.

25. A smoldering type volume reducing disposal system as set forth in claim 3, including a plurality of temperature sensors across the height direction of said surrounding wall.

26. A smoldering type volume reducing disposal system as set forth in claim 25, including a soaking level detecting means for detecting a height level of said soaking region based on temperature information obtained from said plurality of temperature sensors.

27. A smoldering type volume reducing disposal system as set forth in claim 26, including a soaking position indicator means located outside the surrounding walls indicating a height level of said soaking region based on a detection signal from said soaking level detecting means.

28. A smoldering type volume reducing disposal system as set forth in claim 3, including a top surface position indicator means located outside the surrounding walls indicating the level of the top surface of the disposed layer inside the vessel.

29. A smoldering type volume reducing disposal system as set forth in claim 28, characterized in that, said top surface position indicator means has first fixed pulleys supported above the chamber of the vessel and having a wire member having a weight to be placed on the top surface of the disposed layer inside the vessel connected to one end and extending in the vertical direction wound there around, a second fixed pulley supported outside the vessel below a bottom level of the vessel and having the wire member from a first fixed pulley wound there around, a third fixed pulley supported above the chamber of the vessel and having the wire member extending in the vertical direction from the second fixed pulley wound there around, a tension imparting member connected to the other end of the wire member extending from the third fixed pulley in the vertical direction, and an indicator mark provided at the same position as the height level of the weight at the wire member between the second fixed pulley and third fixed pulley.

30. A smoldering type volume reducing disposal system as set forth in claim 3, including a carbonization solution tank for condensing dry distillation gas discharged from the dry distillation vessel to a carbonization solution and a cooling system for cooling residual gas taken out from the carbonization solution tank without allowing it to contact outside air.

\* \* \* \* \*